(12) United States Patent
Cowen

(10) Patent No.: US 7,351,519 B2
(45) Date of Patent: Apr. 1, 2008

(54) PATTERNING OF INDIUM-TIN OXIDE (ITO) FOR PRECISION-CUTTING AND ALIGNING A LIQUID CRYSTAL DISPLAY (LCD) PANEL

(75) Inventor: Timothy A. Cowen, Lower Burrell, PA (US)

(73) Assignee: Advantech Global, Ltd, Tortola (VG)

( * ) Notice: Subject to any disclaimer, the term of this patent is extended or adjusted under 35 U.S.C. 154(b) by 172 days.

(21) Appl. No.: 10/995,682

(22) Filed: Nov. 23, 2004

(65) Prior Publication Data
US 2006/0110547 A1 May 25, 2006

(51) Int. Cl.
*G02F 1/1345* (2006.01)

(52) U.S. Cl. .................. 430/319; 430/312; 430/316; 430/321; 430/394

(58) Field of Classification Search ............... None
See application file for complete search history.

(56) References Cited

U.S. PATENT DOCUMENTS

| | | | |
|---|---|---|---|
| 4,255,848 A | 3/1981 | Freer et al. | |
| 5,457,356 A | 10/1995 | Parodos | |
| 5,499,127 A | 3/1996 | Tsubota et al. | |
| 5,760,851 A | 6/1998 | Inbar et al. | |
| 6,509,949 B1 | 1/2003 | Lu et al. | |
| 2001/0022644 A1* | 9/2001 | Hinata | 349/149 |

FOREIGN PATENT DOCUMENTS

| | | | |
|---|---|---|---|
| JP | 2-093404 A | * | 4/1990 |
| JP | 8-152648 A | * | 6/1996 |

* cited by examiner

*Primary Examiner*—John A. McPherson
(74) *Attorney, Agent, or Firm*—The Webb Law Firm

(57) ABSTRACT

A method of improved patterning of indium-tin oxide (ITO) for precision-cutting and aligning a liquid crystal display (LCD) panel includes depositing a transparent ITO layer upon a transparent substrate, depositing a non-transparent plating layer upon the transparent ITO layer and depositing a photoresist layer upon the non-transparent plating layer. The photoresist layer is patterned, exposed and developed to form a plurality of photoresist lines. The photoresist lines are exposed again in an active area only and the plating layer is etched to form a plurality of non-transparent plated lines. The ITO layer is then etched to form a plurality of ITO lines. The photoresist lines are then developed and the non-transparent plated lines are etched away in the active area only. The photoresist that is outside the active area is then removed.

2 Claims, 15 Drawing Sheets

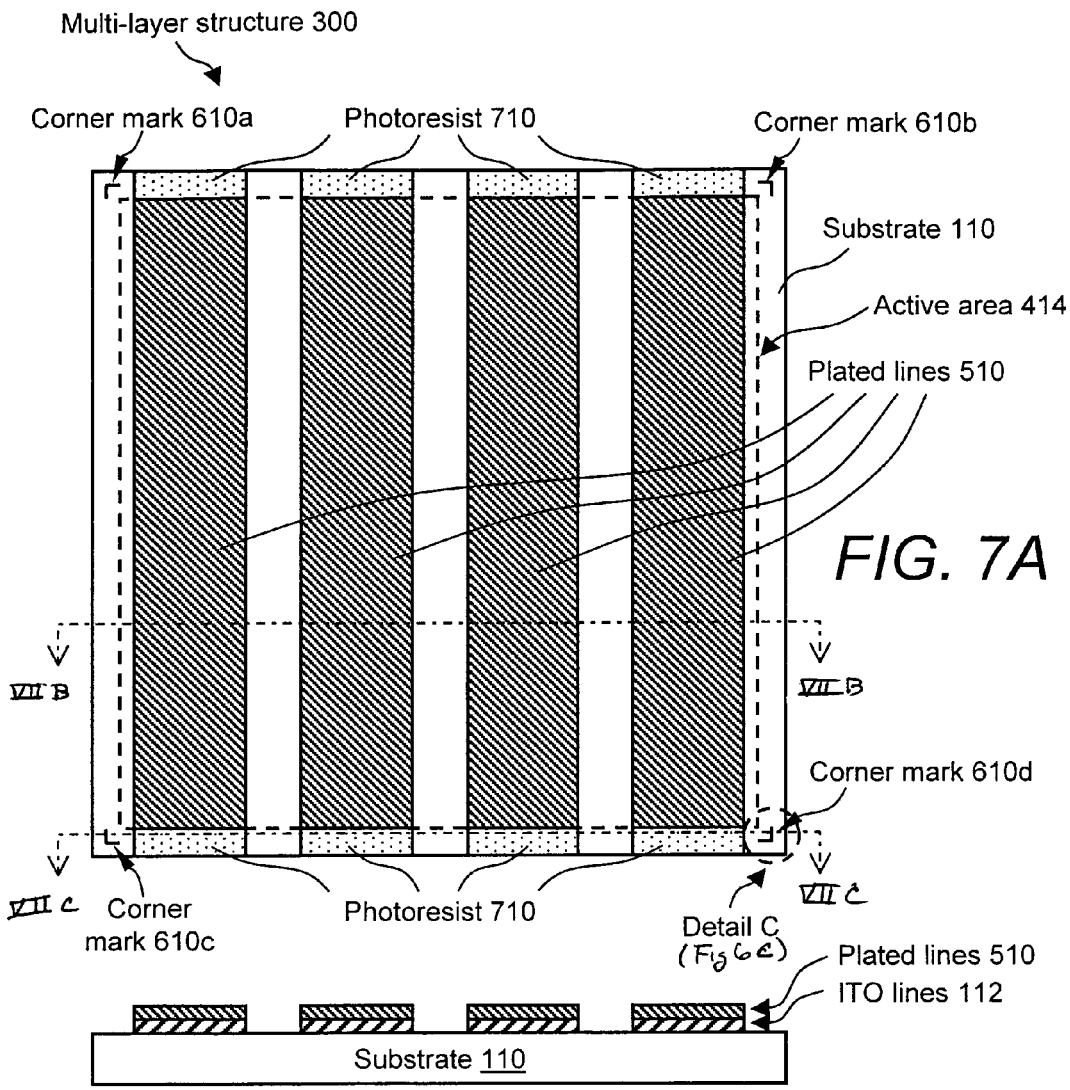
FIG. 7A
FIG. 7B
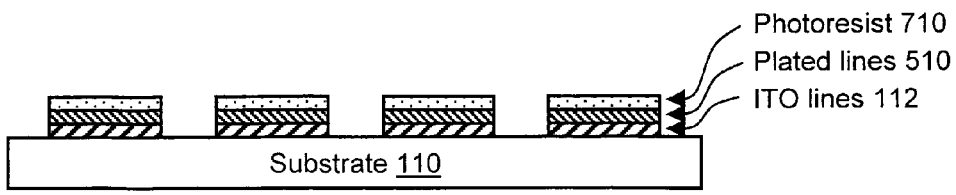
FIG. 7C

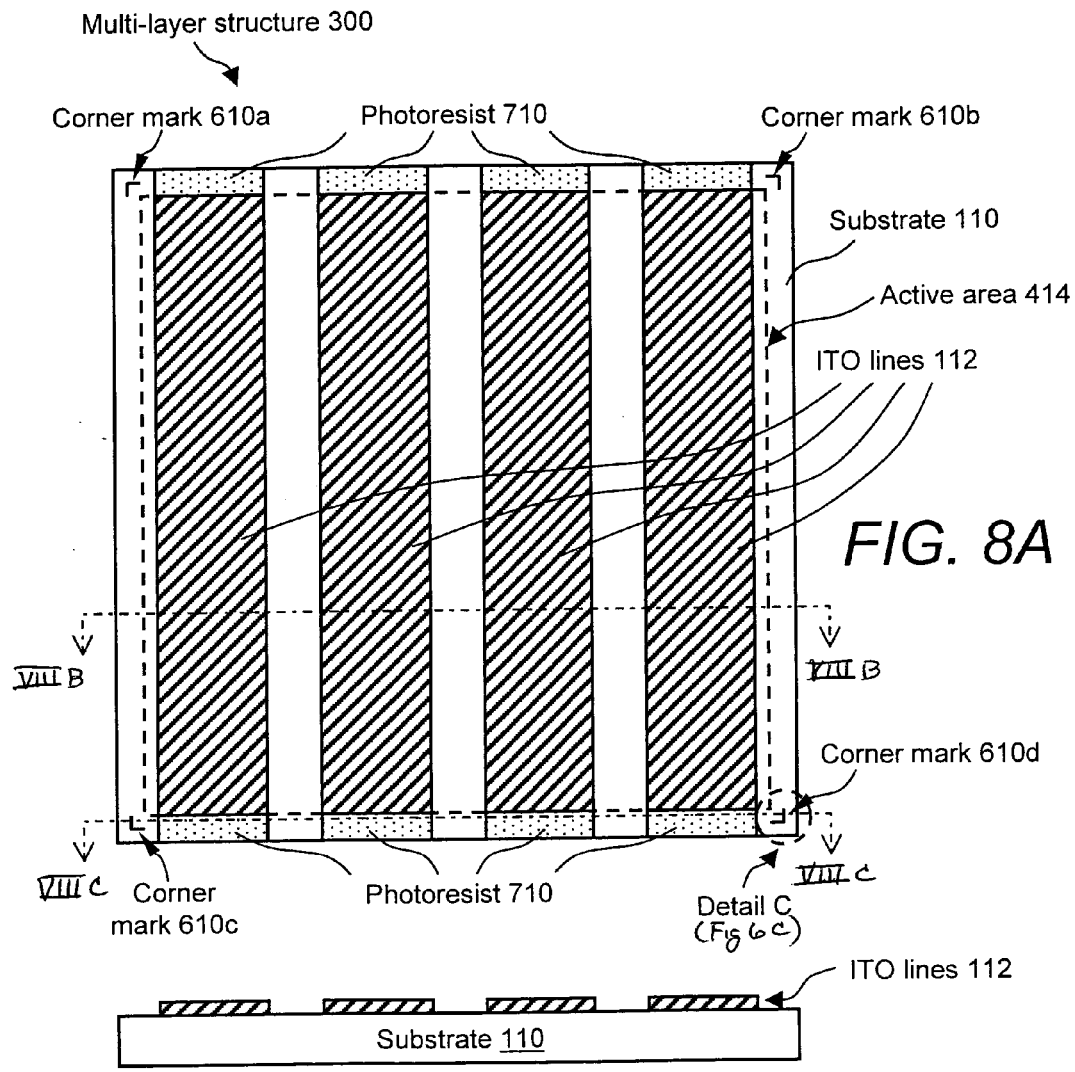
FIG. 8A
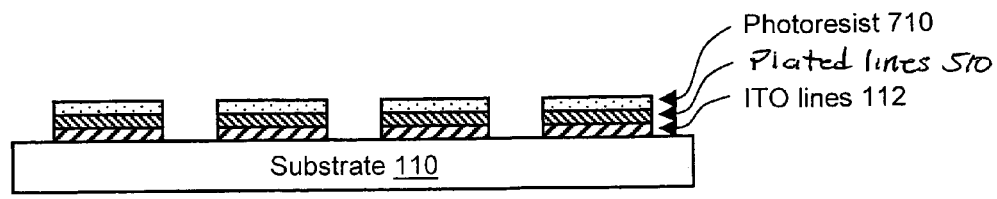
FIG. 8B
FIG. 8C

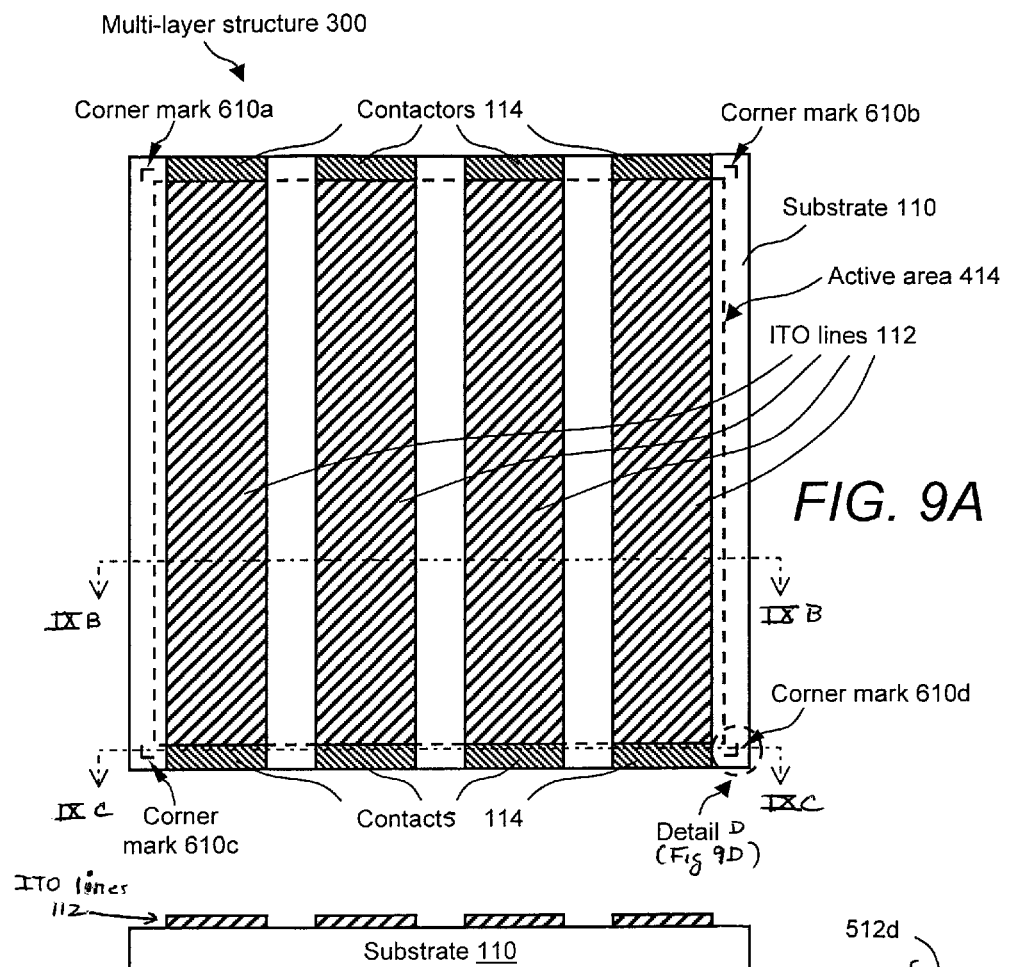
FIG. 9A
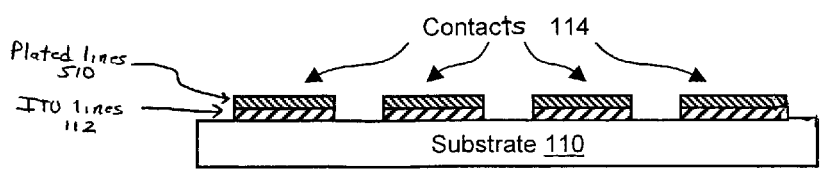
FIG. 9B
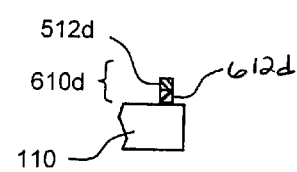
FIG. 9D
FIG. 9C

PATTERNING OF INDIUM-TIN OXIDE (ITO) FOR PRECISION-CUTTING AND ALIGNING A LIQUID CRYSTAL DISPLAY (LCD) PANEL

BACKGROUND OF THE INVENTION

1. Field of the Invention

The present invention relates to liquid crystal displays (LCDs) and, more particularly, to an LCD panel and a method of improved patterning of indium-tin oxide (ITO) for precision-cutting and aligning of the LCD panel.

2. Description of Related Art

A liquid crystal display (LCD) is a thin, lightweight display device that has no moving parts. It consists of an electrically-controlled, light-polarising liquid that is trapped in cells between two transparent polarising sheets. The polarising axes of the two sheets are aligned perpendicular to each other. Each cell is supplied with electrical contacts that allow an electric field to be applied to the liquid inside.

LCDs that have a small number of segments, such as those used in digital watches and pocket calculators, are supplied with one electrical contact for each segment. The electrical signal used to drive each segment is supplied from an external circuit. Small and medium-sized displays have a passive matrix structure, which has one set of contacts for each row and column of the display, rather than one for each pixel.

A conventional LCD consists of an upper glass substrate and a lower glass substrate positioned in spaced parallel relation. One or more transparent electrodes are formed on the upper surface of the lower glass substrate. One or more transparent electrodes are also formed on the lower surface of the upper glass substrate. The liquid crystal material is sandwiched between the two glass substrates and a polarizing film is added to the outer side of each substrate. Because an LCD requires backlighting in order to provide the light source for each pixel, the glass substrate is formed of a transparent material, such as glass and the electrodes are also formed of a transparent, electrically conductive material, such as ITO.

Because each panel of an LCD is formed of a transparent substrate that has transparent electrodes, there are no visible features that are useful in performing a precision cutting operation in the manufacture thereof and, thus, the accuracy to which an LCD panel may be sized is limited. Furthermore, the lack of visible features is prohibitive for aligning one LCD panel to another.

Therefore, what is needed, and not disclosed in the art, is a method of providing visible features for accurately cutting and grinding a transparent substrate that has transparent ITO lines formed thereon to a desired precise dimension and visible features for use in aligning one LCD panel to another.

SUMMARY OF THE INVENTION

The invention is a panel for use in a liquid crystal display (LCD). The panel includes an electrically insulative and optically transparent substrate, at least one electrically conductive and optically transparent line disposed on the substrate and an electrically conductive and optically opaque contact disposed adjacent at least one end of each line in electrical contact therewith.

The substrate can be rectangular and at least one corner of the rectangular substrate can include an electrically conductive and optically opaque corner mark. Each line, each contact and each corner mark can be formed from an optically transparent metal deposited on the substrate and each contact and each corner mark can further be formed from an optically opaque metal deposited over the optically transparent metal thereof.

The substrate can be comprised of glass, the optically transparent metal can be comprised of indium-tin oxide and the optically opaque metal can be comprised of at least one of chrome, aluminum and nickel.

The invention is also a method of forming a panel for use in a liquid crystal display (LCD). The method includes (a) depositing a first, electrically conductive and optically transparent, material on one surface of an electrically insulative and optically transparent substrate; (b) depositing a second, electrically conductive and optically opaque, material on the surface of the first material opposite the substrate; (c) selectively removing one or more portions of the second material to define at least one line of second material; (d) selectively removing one or more portions of the first material exposed by the removal of the overlaying portion(s) of the second material in step (c); and (e) selectively removing the second material defining each line thereof except for a portion of the second material adjacent at least one end of the line.

Between steps (b) and (c), the method can further include depositing a photoresist on the surface of the second material opposite the first material and selectively removing the one or more portions of the photoresist thereby exposing the one or more portions of the second material.

Between steps (d) and (e), the method can further include, except for the remaining photoresist overlaying the second material adjacent the one end of the line, removing the remaining photoresist overlaying each line of the second material.

The method can further include (f) removing the remaining photoresist overlaying the second material adjacent the one end of the line.

When the photoresist is a positive photoresist, prior to removal, the photoresist being removed can be selectively rendered soluble.

Steps (c)-(e) can further define a corner mark adjacent at least one corner of the substrate. Each corner mark can comprise a deposit of second material overlaying a deposit of first material overlaying the substrate adjacent the corner of the substrate.

The invention is also a method of forming a panel for use in a liquid crystal display (LCD). The method includes (a) depositing transparent electrically conductive material on a transparent electrically insulative substrate; (b) depositing non-transparent electrically conductive material on the transparent electrically conductive material; (c) depositing photoresist on the non-transparent electrically conductive material; (d) selectively removing a portion of the photoresist; (e) selectively removing the non-transparent electrically conductive material that underlaid the portion of the photoresist removed in step (d) thereby leaving a first portion of the non-transparent electrically conductive layer with the photoresist thereon; (f) selectively removing the portion of the transparent electrically conductive material that underlaid the non-transparent electrically conductive material removed in step (e) thereby leaving a first portion of the transparent electrically conductive material underlying the first portion of the non-transparent electrically conductive material with the photoresist thereon; (g) selectively removing a portion of the remaining photoresist on the first portion of the non-transparent electrically conductive material thereby leaving a second portion of the non-transparent electrically conductive material with the photoresist thereon; (h) selectively removing a portion of the non-transparent electrically conductive material that underlaid the portion of the photoresist removed in step (g) thereby exposing a surface of the first portion of the transparent electrically conductive material; and (i) removing the remaining photoresist on the second portion of non-transparent electrically conductive material thereby exposing an underlying surface of a stack of material that includes non-transparent electrically conductive material overlaying transparent electrically conductive material overlaying a portion of the substrate.

The first portion of the transparent electrically conductive material exposed in step (h) can define one or more spaced parallel lines of the transparent electrically conductive material. The stack of material in step (i) can define (1) one or more contacts each of which is in electrical communication with a line of the transparent electrically conductive material and/or (2) one or more corner marks each of which is located adjacent a corner of the substrate. Each corner mark can be electrically isolated from each other corner mark and each line.

Between step (c) and step (d), the method can further include selectively rendering the portion of the photoresist soluble. Between step (f) and step (g), the method can further include selectively rendering the portion of the remaining photoresist soluble. Between step (h) and step (i), the method can further include selectively rendering the remaining photoresist soluble.

Nitric acid can be utilized to remove the non-transparent electrically conductive material. Hydrochloric acid can be utilized to remove the transparent electrically conductive material.

Lastly, the invention is a method of forming a panel for use in a liquid crystal display (LCD). The method includes (a) providing a substrate having a layer of a first material thereon and a layer of a second material on the layer of the first material; (b) removing one or more portions of the second material thereby defining at least one line of second material; (c) removing one or more portions of the first material exposed by the removal of the second material in step (b) thereby defining under each line of second material at least one line of first material; and (d) except for a portion of the second material adjacent at least one end of each line thereof, removing the second material defining each line thereby exposing the portion of each line of first material under the removed second material Steps (b)-(d) can further define a corner mark adjacent at least one corner of the substrate. Each corner mark can comprise a deposit of second material overlaying a deposit of first material overlaying the substrate adjacent the corner of the substrate.

BRIEF DESCRIPTION OF THE DRAWINGS

FIGS. 3A-9C are views of various steps of an ITO panel formed in accordance with the present invention;

DETAILED DESCRIPTION OF THE INVENTION

Figure 1A:
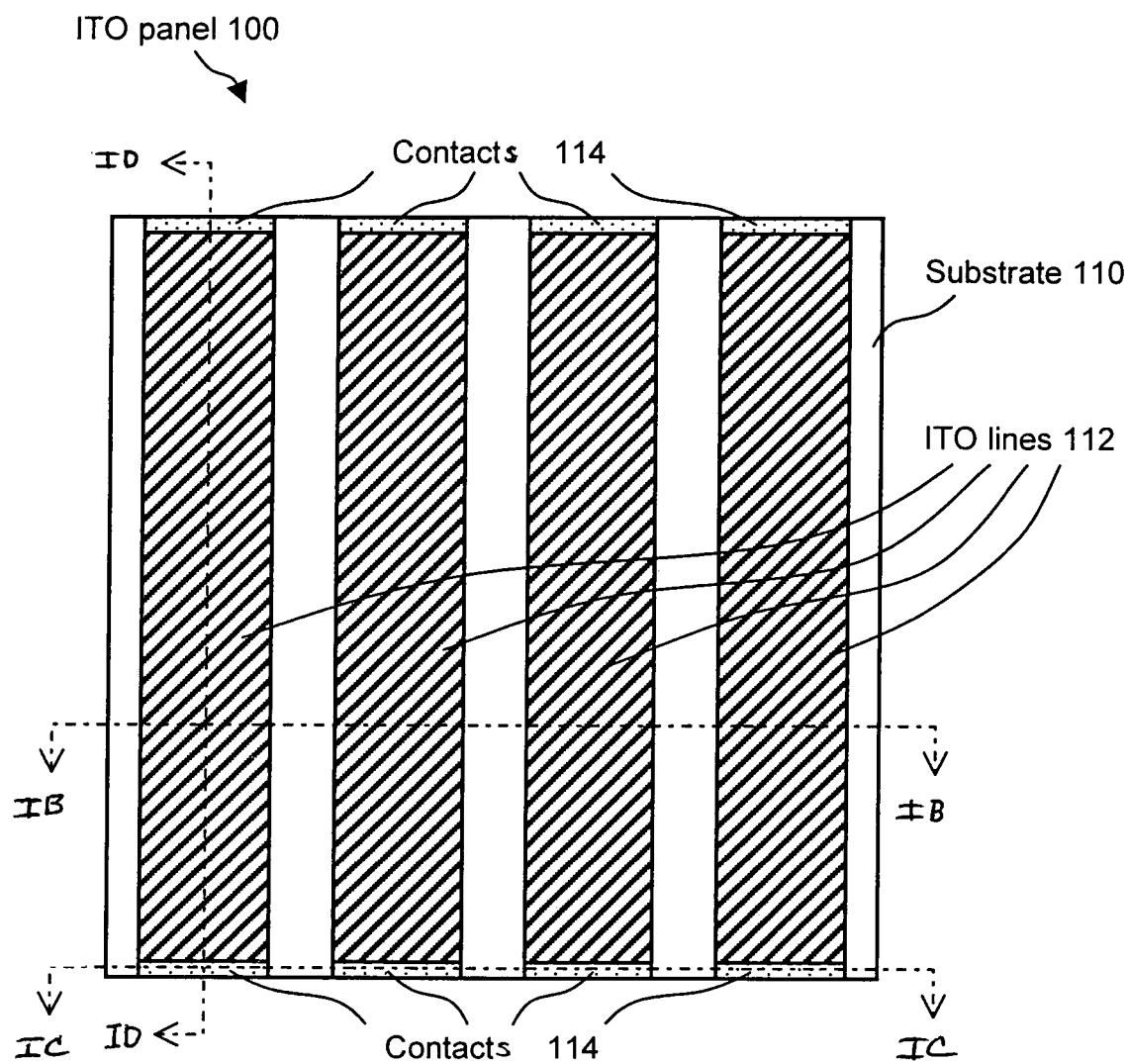
FIG. 1A is a plan view of a ITO panel in accordance with the present invention.

With reference to FIG. 1A, ITO panel 100 includes a substrate 110 formed of a transparent material, such as glass, upon which is deposited a plurality of ITO lines 112 that is arranged in parallel to form a set of transparent, electrically conductive electrodes. A plurality of contacts 114 is formed atop opposing ends of ITO lines 112. Contacts 114 are formed from non-transparent material, as described in more detail in FIGS. 1C and 1D, and provide an electrical contact means to ITO lines 112.

In one exemplary embodiment, ITO lines 112 are 20 mils wide and spaced 10 mils apart and substrate 110 is sized such that two ITO panels 100 may be arranged side-to-side in a tiled arrangement, while still maintaining the 10 mil spacing between ITO lines 112 across the boundary from one ITO panel 100 to the next. The aforementioned dimensions are exemplary only since ITO lines 112 may be formed of any desired length, width, and spacing, and substrate 110 may be sized according.

Figure 1B:
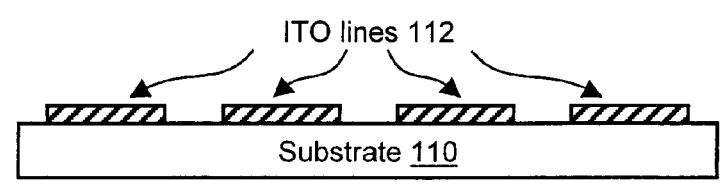
FIG. 1B is a section taken along line IB-IB in FIG. 1A.

With reference to FIG. 1B, and with continuing reference to FIG. 1A, desirably the plurality of ITO lines 112 are evenly spaced on substrate 110. The thickness of substrate 110 is desirably in the range of, for example, 0.5-1.0 mm. The thickness of ITO lines 112 is desirably in the range of, for example, 100-500 nm.

Figure 1C:
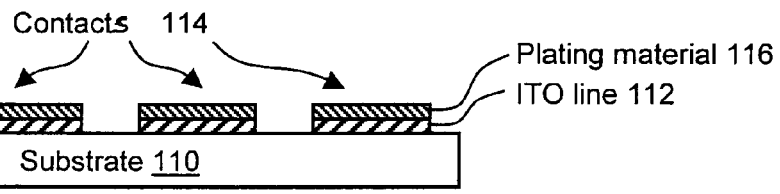
FIG. 1C is a section taken along line IC-IC in FIG. 1A.
Figure 1D:
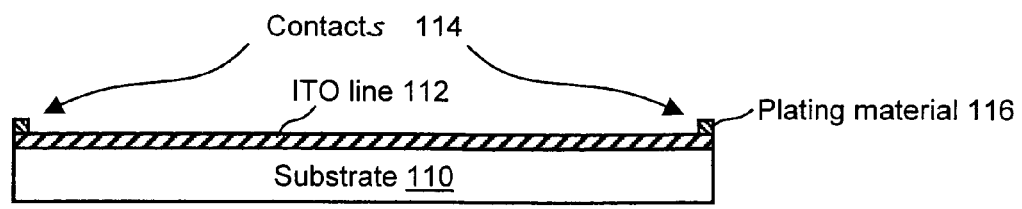
FIG. 1D is a section taken along line ID-ID in FIG. 1A.

With reference to FIGS. 1C and 1D, and with continuing reference to FIGS. 1A and 1B, each contact 114 is formed of a layer of plating material 116 deposited atop a respective ITO line 112. Plating material 116 is desirably a non-transparent, electrically conductive material, such as chrome, aluminum, nickel, or other suitable metal. However, this is not to be construed as limiting the invention. The thickness of plating material 116 is desirably in the range of, for example, 50-200 nm.

FIGS. 1A-1D show substrate 110 at its finished size, while FIGS. 2 through 9D show further details of forming ITO panel 100, which initially includes substrate 110 at an unfinished size.

Figure 2:
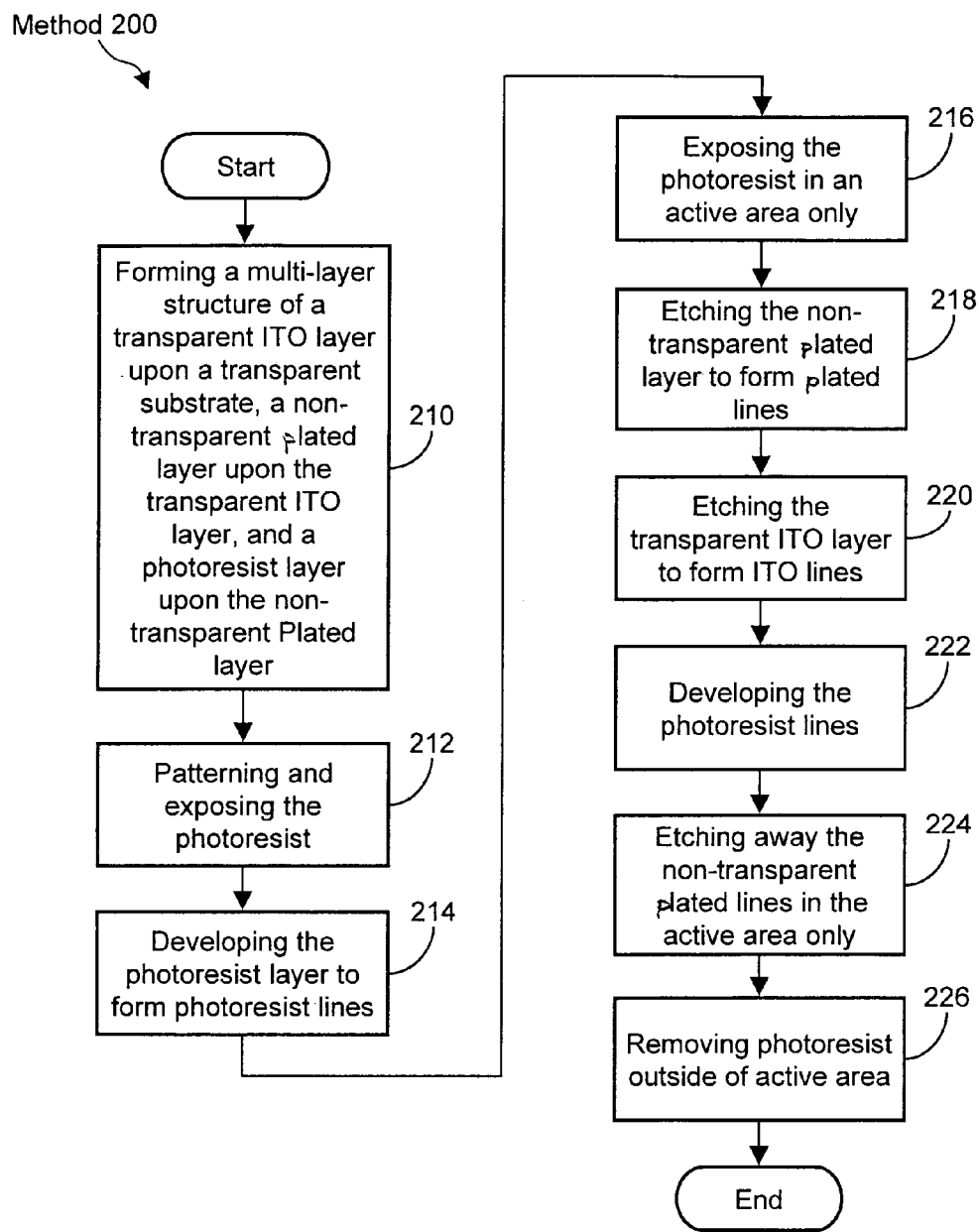
FIG. 2 is a flow diagram of a method of making an ITO panel in accordance with the present invention.

With reference to FIG. 2, a method of forming ITO panel 100 will now be described with reference to FIGS. 3A-9C.

Figure 3A:
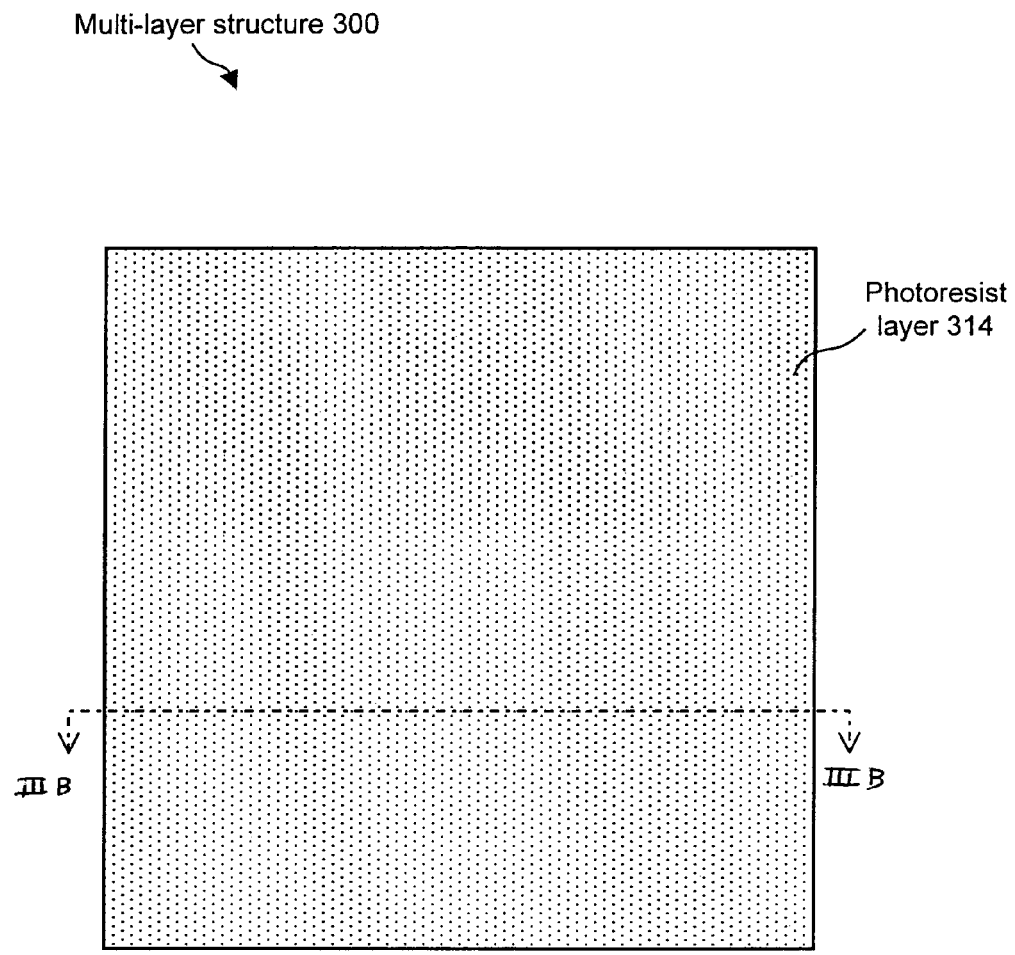
Figure 3B:
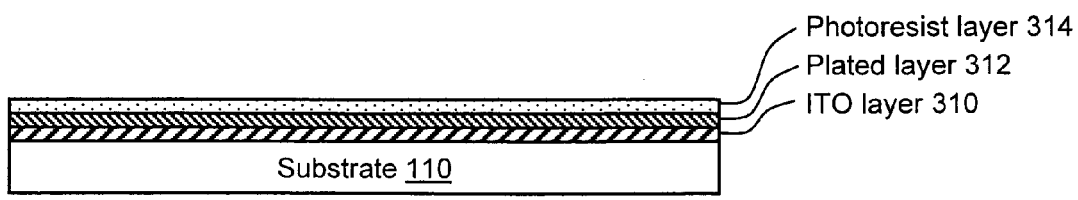

With reference to FIGS. 3A and 3B, which illustrate a top view of a multi-layer structure 300 and a section taken along line IIIB-IIIB in FIG. 3A, respectively, the method commences at step 210 wherein rough-cut multi-layer 300 structure is formed. Multi-layer structure 300 includes substrate 110 at an unfinished size. Multi-layer structure 300 further includes an ITO layer 310 deposited on substrate 110, a plating layer 312 deposited on ITO layer 310 and a photoresist layer 314 deposited on plating layer 312. ITO layer 310 is a layer of indium-tin oxide (ITO) that desirably has a thickness of between 100 and 500 nm. Plating layer 312 is a layer of non-transparent, electrically conductive material, such as, without limitation, chrome, aluminum, nickel or other suitable metal, that desirably has a thickness of between 50 and 200 nm. ITO layer 310 and plating layer 312 can be deposited by any suitable technique, such as sputtering or evaporation. Photoresist layer 314 is a light sensitive material used in the process of photolithography to form a pattern on a surface. Photoresist layer 314 is typically deposited in liquid form by any standard technique, such as spin coating, spray coating or dip coating.

Photoresists are classified into two groups: positive resists and negative resists. Photoresist layer 314 can be a positive resist wherein the exposed areas become more sensitive to chemical etching whereupon the exposed areas can be removed during the developing process. A positive resist is a type of photoresist in which the portion of the photoresist that is exposed to light, such as ultraviolet (UV) light, becomes soluble to the photoresist developer and the portion of the photoresist that is unexposed remains insoluble to the photoresist developer. Alternatively, photoresist layer 314 can be a negative resist wherein the exposed areas become resistant to chemical etching whereupon the unexposed areas can be removed during the developing process. A negative resist is a type of photoresist in which the portion of the photoresist that is exposed to light becomes relatively insoluble to the photoresist developer and the portion of the photoresist that is unexposed is dissolved by the photoresist developer.

Figure 4A:
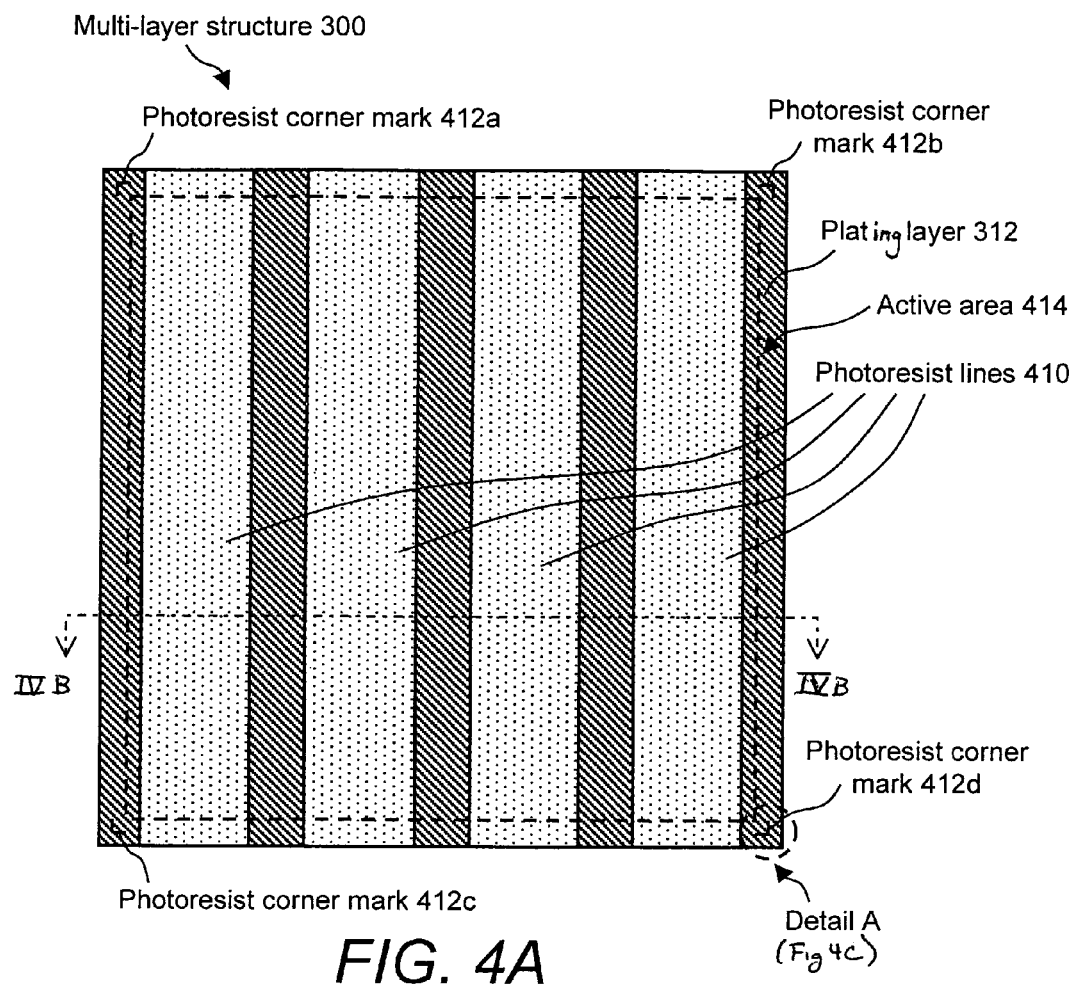
Figure 4B:
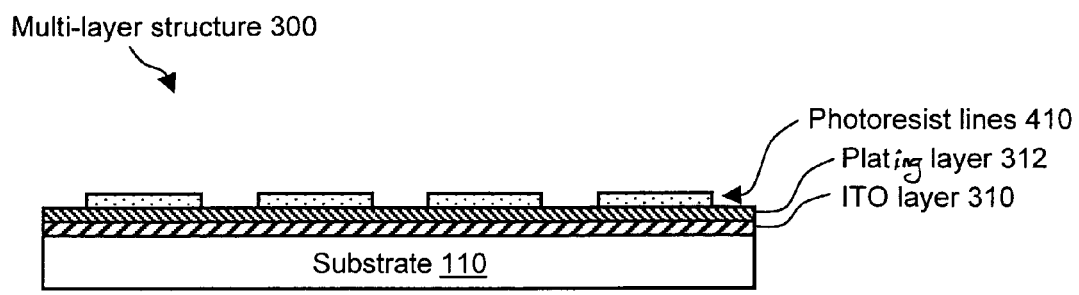
Figure 4C:
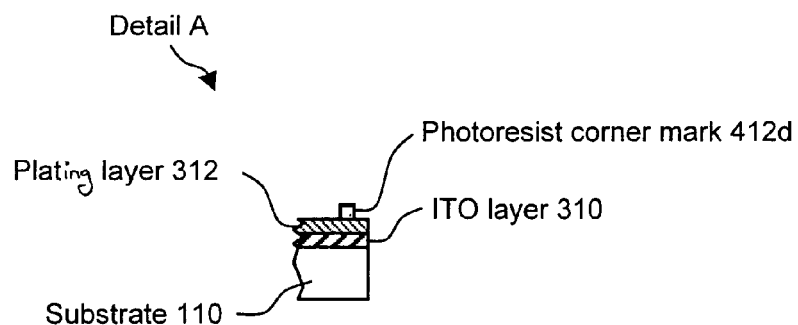

With reference to FIGS. 4A, 4B, and 4C, which illustrate a top view of multi-layer structure 300, a section taken along line IVB-IVB in FIG. 4A and a Detail A of a photoresist corner mark 412d, respectively, the method advances to step 212 wherein photoresist layer 314 is patterned and exposed to form a plurality of photoresist lines 410 and a plurality of photoresist corner marks 412, i.e., photoresist corner marks 412a, 412b, 412c and 412d. Photoresist lines 410 and photoresist corner marks 412 are defined on the surface of photoresist layer 314 by the exposure of photoresist layer 314 to UV light through a photomask (not shown), as is well known. In the case where photoresist layer 314 is a positive resist, the portion of photoresist layer 314 that defines photoresist lines 410 and photoresist corner marks 412 is protected by the photomask (not shown) and, thus, is not exposed to the UV light.

The method then advances to step 214 wherein multi-layer structure 300 is exposed to a standard photoresist developer, which is a solution used to resolve an image after its exposure by dissolving selected parts of the photoresist following its selective irradiation. In the case where photoresist layer 314 is a positive resist, the portion of photoresist layer 314 that was exposed to UV light in step 212 becomes soluble to the photoresist developer, i.e., chemical etch out. As a result, the photoresist material of the portion of photoresist layer 314 that is outside of the area that defines photoresist lines 410 and photoresist corner marks 412 is stripped away thereby defining photoresist lines 410 and photoresist corner marks 412 atop plating layer 312 of multi-layer structure 300.

The method then advances to step 216 wherein photoresist lines 410 are exposed to UV light through a photomask (not shown) in an active area 414 of multi-layer structure 300. Active area 414 is representative of an area wherein an array of display pixels is to be formed. In the case in which photoresist layer 314 is a positive resist, the portion of photoresist lines 410 that fall outside of active area 414 is protected by the photomask and, thus, not exposed to the UV light.

Figure 5A:
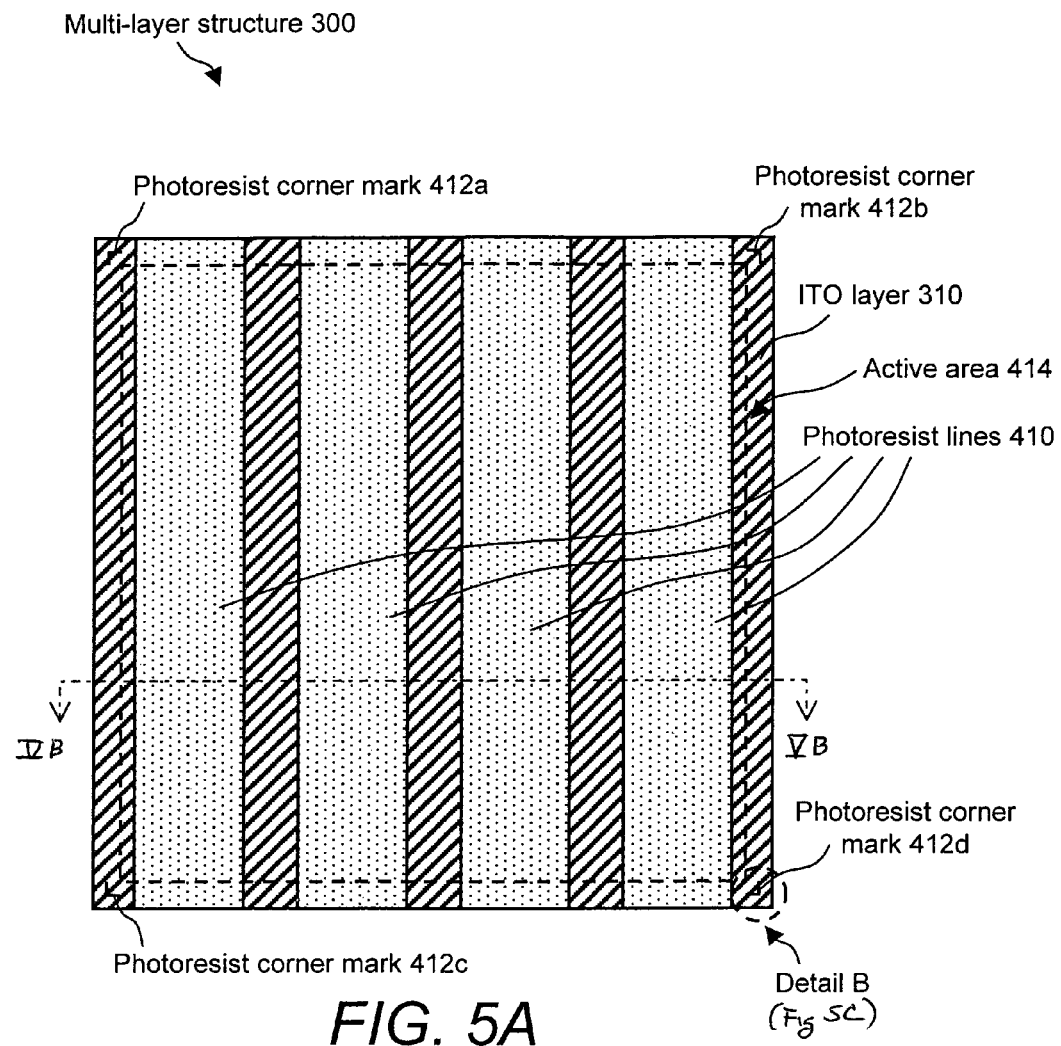
Figure 5B:
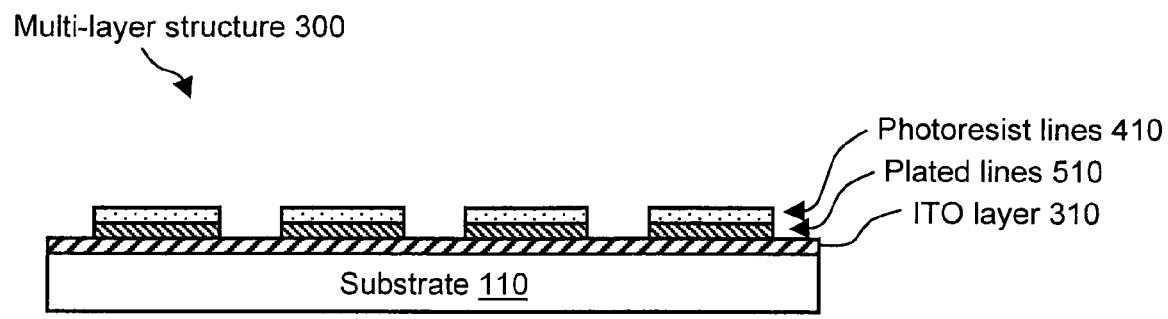
Figure 5C:
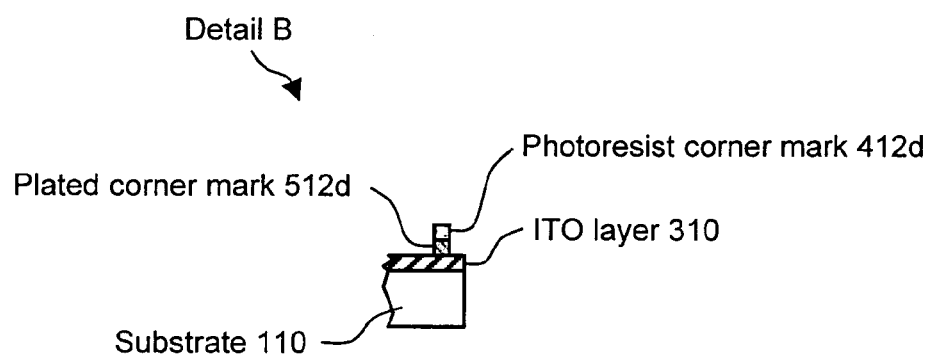

With reference to FIGS. 5A, 5B and 5C, which illustrate a top view of multi-layer structure 300, a section taken along line VB-VB of FIG. 5A and a Detail B of plated corner mark 512d, respectively, the method then advances to step 218 wherein plating layer 312 is etched to form a plurality of plated lines 510 and a plurality of plated corner marks 512, i.e., plated corner marks 512a, 512b, 512c and 512d. In step 218, the entire surface of multi-layer structure 300, i.e., inside and outside active area 414, is chemically etched. If plating layer 312 is formed of, for example, chrome, the entire surface of multi-layer structure 300 is chemically etched with, for example, nitric acid. The portions of plating layer 312 that are not protected by photoresist lines 410 and photoresist corner marks 412 are exposed to the nitric acid whereupon the portion of plating layer 312 between photoresist lines 410 and photoresist corner marks 412 is stripped away thereby defining a set of plated lines 510 and plated corner marks 512 atop ITO layer 310 of multi-layer structure 300. Importantly, photoresist lines 410 exposed to UV light in step 216 are not stripped away by the nitric acid utilized to strip away the portion of plating layer 312 between photoresist lines 410 and photoresist corner marks 412.

Figure 6A:
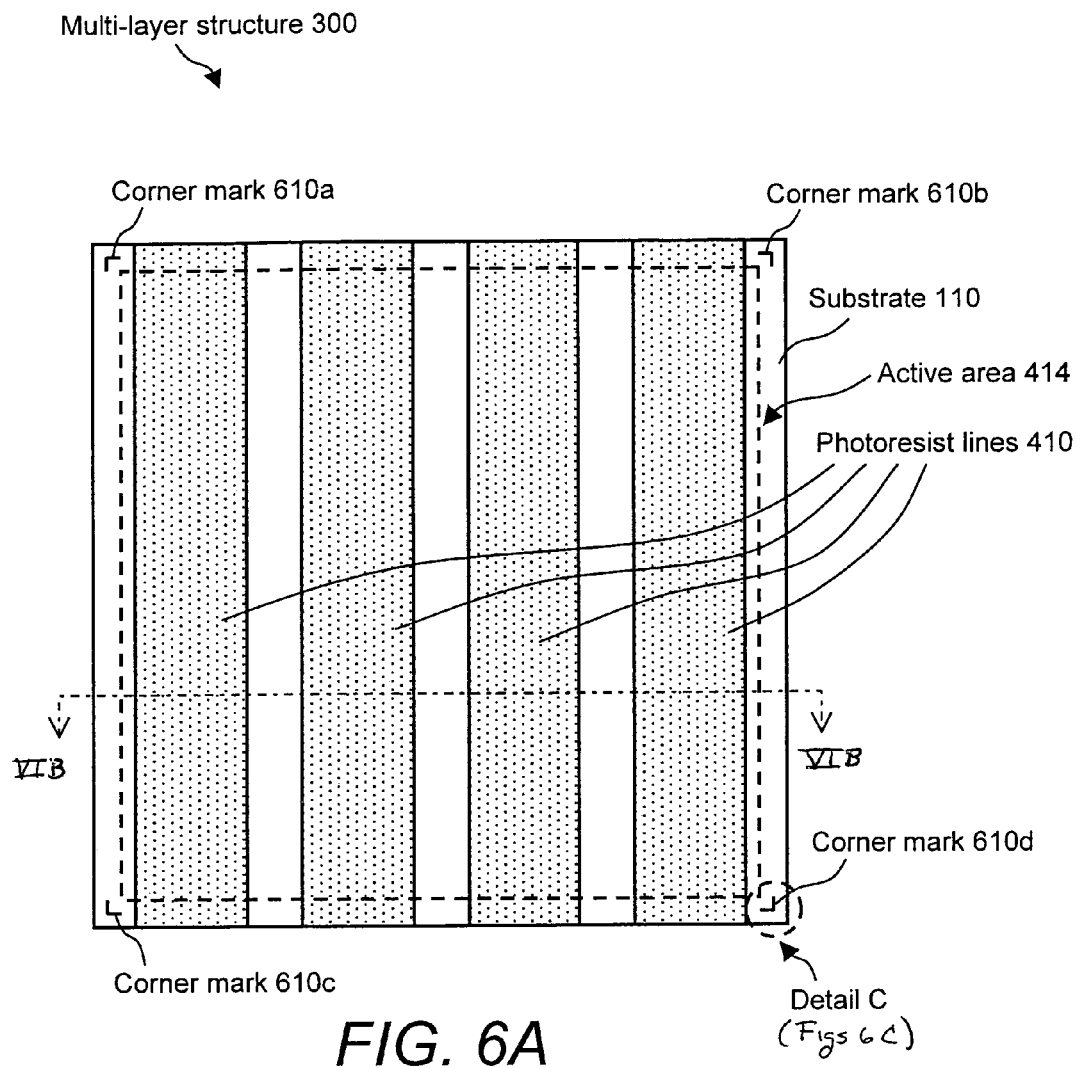
Figure 6B:
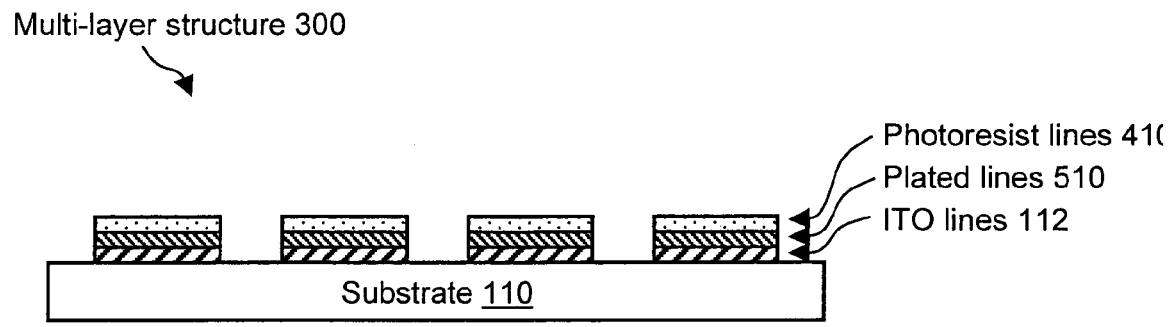
Figure 6C:
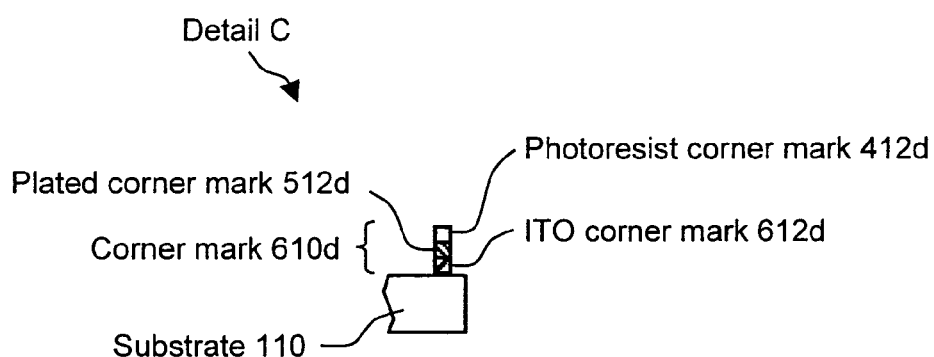

With reference to FIGS. 6A, 6B and 6C, which illustrate a top view of multi-layer structure 300, a section taken along line VIB-VIB of FIG. 6A and a Detail C of corner mark 610d, respectively, the method then advances to step 220 wherein ITO layer 310 is etched to form a plurality of ITO lines 112 and a plurality of ITO corner marks 610, i.e., corner mark 610A, 610B, 610C and 610D. In step 220, the entire surface of multi-layer structure 300, i.e., inside and outside active area 414, is chemically etched with, for example, hydrochloric acid. The portions of ITO layer 310 that are not protected by photoresist lines 410 and photoresist corner marks 412 are exposed to the hydrochloric acid whereupon the portion of ITO layer 310 between photoresist lines 410 and photoresist corner marks 412 is stripped away thereby defining a set of ITO lines 112 and corner marks 610 atop substrate 110 of multi-layer structure 300. For example, corner mark 610d is formed adjacent are corner of multi-layer structure 300 by a stack-up of material that includes ITO corner mark 612d, plated corner mark 512d, and photoresist corner mark 412d. In like manner, the structures of corner marks 610a, 610b and 610c are formed adjacent the three other corners of multi-layer structure 300. Importantly, photoresist lines 410 exposed to UV light in step 216 are not stripped away by the hydrochloric acid utilized to strip away the portion of ITO layer 310 between photoresist lines 410 and photoresist corner marks 412.

With reference to FIGS. 7A, 7B and 7C, which illustrate a top view of multi-layer structure 300, a section taken along line VIIB-VIIB of FIG. 7A and a section taken along line VIIIC-VIIIC of 7A, the method then advances to step 222 wherein photoresist lines 410 are stripped away in active area 414 only. In step 222, multi-layer structure 300 is exposed to a standard photoresist developer. In the case in which photoresist lines 410 are formed of a positive resist, the portion of photoresist lines 410 that were exposed to UV light at step 216 becomes soluble to the photoresist developer. As a result, the photoresist material of the portion of photoresist lines 410 that is inside active area 414 is stripped away thereby defining an area of photoresist 710 atop each end of each plated line 510 of multi-layer structure 300. As a result, a stack-up of ITO lines 112, plated lines 510, and photoresist 710 is formed outside of active area 414.

With references to FIGS. 8A, 8B and 8C, which illustrated top view of multi-layer structure 300, a section taken along line VIIIB-VIIIB in FIG. 8A and a section taken along line VIIIC-VIIIC in FIG. 8A, the method then advances to step 224 wherein plated lines 510 are stripped away in active area 414 only. In step 224, multi-layer structure 300 is chemically etched in active area 414 only. If plated lines 510 are formed of, for example, chrome, the entire surface of multi-layer structure 300 is chemically etched with nitric acid. The portions of plated lines 510 that are not protected by photoresist 710 are exposed to the nitric acid whereupon the portions of plated lines 510 within active area 414 are stripped away thereby defining ITO lines 112 within active area 414. As a result, the area outside of active area 414 includes a stack-up of ITO lines 112, plated lines 510 and photoresist 710, as shown in FIG. 8C, along with each corner mark 610 which includes a stack-up of ITO corner mark 612, plated corner mark 512 and photoresist corner mark 412, as shown in FIG. 6C. At the same time, only ITO lines 112 remain inside active area 414, as shown in FIG. 8B.

With reference to FIGS. 9A, 9B, 9C, and 9D, which illustrate a top view of multi-layer structure 300, a section taken along line IXB-IXB in FIG. 9A, a section taken along line IXC-IXC in FIG. 9A and a Detail D of corner mark 610d, the method then advances to step 226 wherein the remaining photoresist 710 located outside of active area 414 is removed. In step 226, the remaining photoresist 710 of multi-layer structure 300 is chemically stripped. As a result, the area outside of active area 414 includes contacts 114 each of which is comprised of a stack-up of an ITO line 112 and a plated line 510, as shown in FIG. 9C, along with each corner mark 610 which includes a stack-up of ITO corner mark 612 and plated corner mark 512. At the same time, only ITO lines 112 remain inside active area 414, as shown in FIG. 9B. As a result, a visible structure is formed within each contact 114 via the inclusion of the plating material 116 that forms the portion of plated line 510 of contact 114. The multi-layer structure 300 shown in FIGS. 9A, 9B, 9C and 9D is representative of ITO panel 100 of FIG. 1 in a rough-cut state.

An advantage of method 200 is that, by performing the etching operations of steps 218 and 220 after the exposure operation of step 216 rather than before the exposure operation of step 216, the composition of photoresist lines 410 is not damaged by the nitric acid or hydrochloric acid. Damaging the composition of photoresist lines 410 does not allow it to be exposed properly and, thus, requires photoresist lines 410 to be stripped and re-applied.

Plated corner marks 512 of corner marks 610 and/or the portion of the plated lines 510, formed of plating material 116, forming contacts 114 provide a visible feature for cutting and grinding ITO panel 100 to a desired finished dimension. Additionally, method 200 provides a way for forming visible features by way of plated corner marks 512 of corner marks 610 and/or plating material 116 of contacts 114 for aligning one ITO panel 100 to another in a tiled configuration for forming a scalable large-area LCD.

Figure 10A:
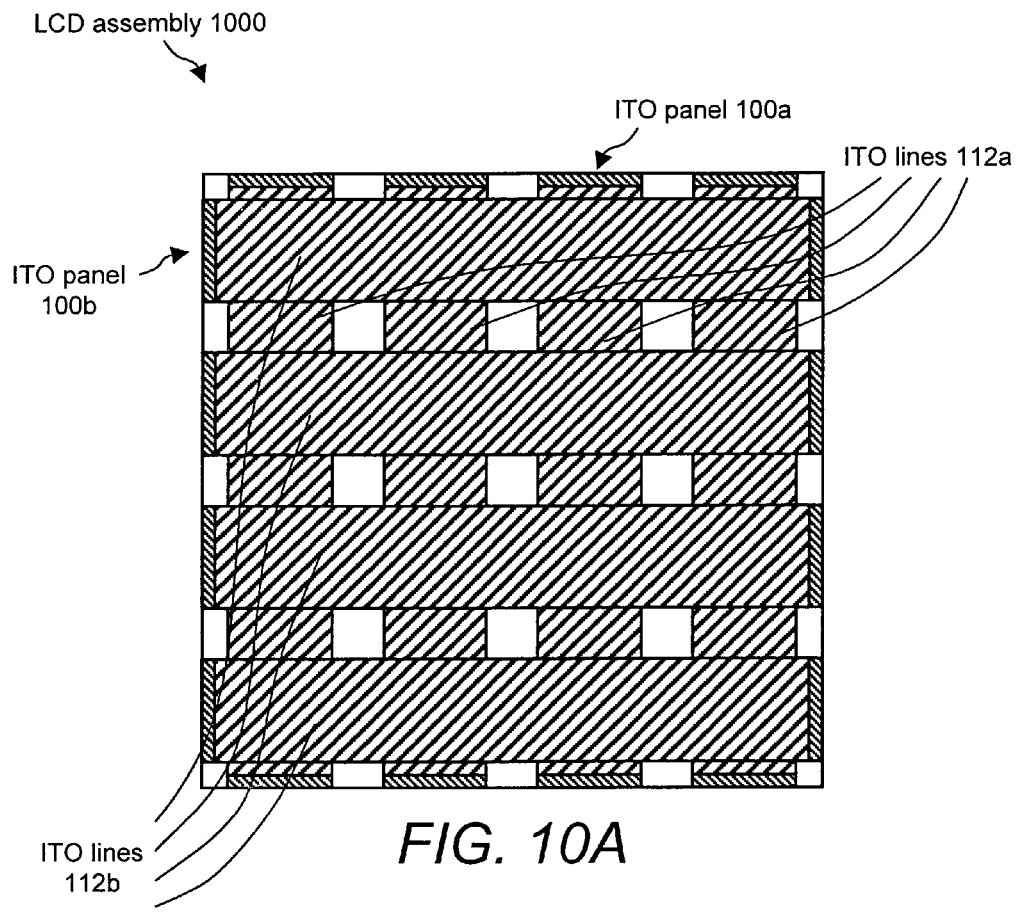
FIGS. 10A and 10B are top and end views, respectively, of an LCD assembly formed from a pair of ITO panels in accordance with the present invention.
Figure 10B:
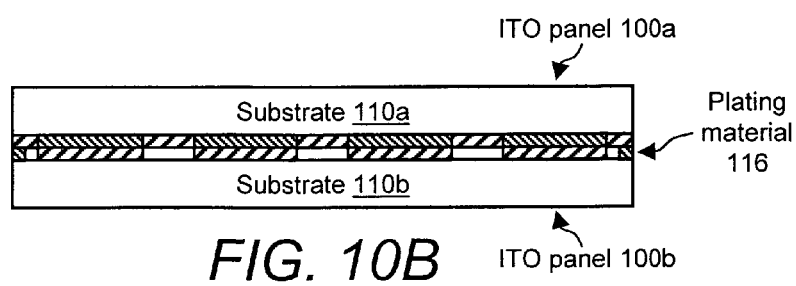

With reference to FIGS. 10A and 10B, an LCD assembly 1000 is formed from a pair of ITO panels 100, e.g., ITO panels 100a and 100b, arranged facing each other and oriented 90 degrees out of phase to one another such that ITO lines 112a of ITO panel 100a are oriented orthogonally to ITO lines 112b of ITO panel 100b. ITO lines 112a of ITO panel 100a and ITO lines 112b of ITO panel 100b serve as transparent electrodes, between which can be sandwiched the liquid crystal material.

Figure 11A:
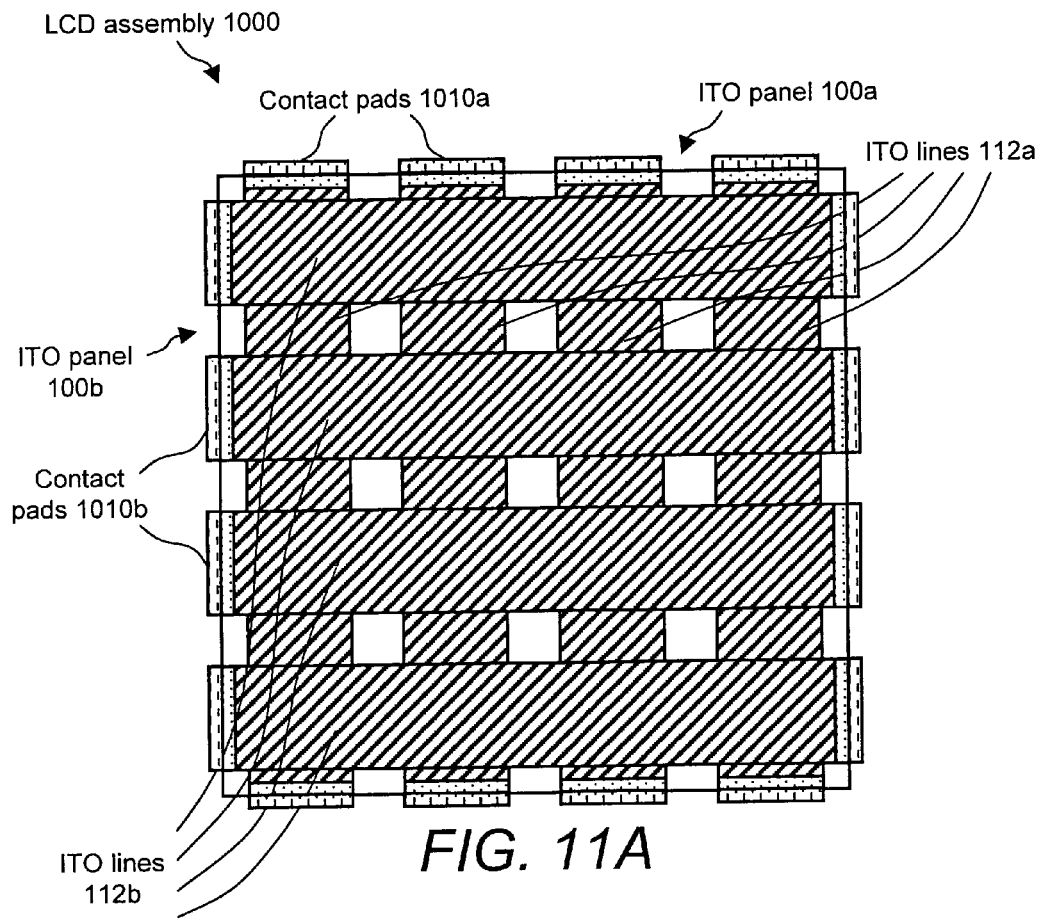
FIGS. 11A and 11B are top and end views, respectively, of the LCD assembly of FIGS. 10A and 10B including a set of contact pads.
Figure 11B:
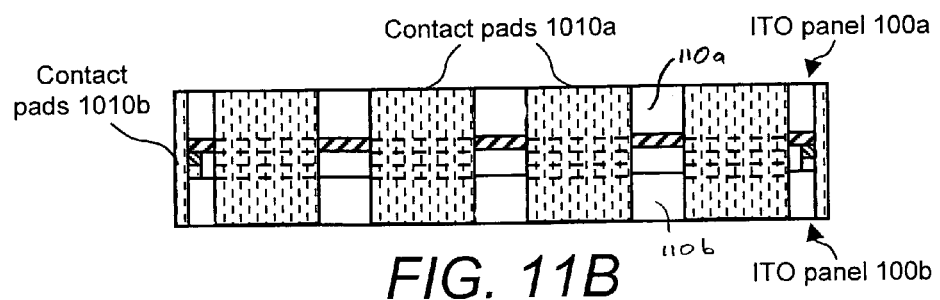

With reference to FIGS. 11A and 11B, contacts 114 of LCD assembly 1000 can be made larger by including additional conductive material on the edges of LCD assembly 1000. More specifically, contact pads 1010a and 1010b can be attached to ITO panel 100a and ITO panel 100b, respectively. Contact pads 1010a and 1010b are formed by any suitable method, such as sputtering, and are formed of conductive material, such as chrome, aluminum, nickel or any other suitable metal. The width of contact pads 1010a and 1010b can be the same width as contacts 114 and the height may be up to the full thickness of LCD assembly 100. Contact pads 1010a and 1010b are electrically connected to plating material 116 and ITO lines 112 of contacts 114. Contact pads 1010a and 1010b provide an easily accessible contact area for providing an electrical connection to each ITO line 112 for receiving electrical stimulus.

The present invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed:

1. A method of forming a panel for use in a liquid crystal display (LCD) comprising:
 (a) depositing a first, electrically conductive and optically transparent, material on one surface of an electrically insulative and optically transparent substrate;
 (b) depositing a second, electrically conductive and optically opaque, material on the surface of the first material opposite the substrate;
 (c) selectively removing one or more portions of the second material to define at least one line of second material;
 (d) selectively removing one or more portions of the first material exposed by the removal of the overlaying portion(s) of the second material in step (c); and
 (e) selectively removing the second material defining each line thereof except for a portion of the second material adjacent at least one end of the line, wherein:
 steps (c)-(e) further define a corner mark adjacent at least one corner of the substrate; and
 each corner mark comprises a deposit of second material overlaying a deposit of first material overlaying the substrate adjacent the corner of the substrate.

2. A method of forming a panel for use in a liquid crystal display (LCD) comprising:
 (a) providing a substrate having a layer of a first material thereon and a layer of a second material on the layer of the first material;
 (b) removing one or more portions of the second material thereby defining at least one line of second material;
 (c) removing one or more portions of the first material exposed by the removal of the second material in step (b) thereby defining under each line of second material at least one line of first material; and
 (d) except for a portion of the second material adjacent at least one end of each line thereof, removing the second material defining each line thereby exposing the portion of each line of first material under the removed second material, wherein:
 steps (b)-(d) further define a corner mark adjacent at least one corner of the substrate; and
 each corner mark comprises a deposit of second material overlaying a deposit of first material overlaying the substrate adjacent the corner of the substrate.

* * * * *